(12) United States Patent
A et al.

(10) Patent No.: US 11,252,025 B2
(45) Date of Patent: Feb. 15, 2022

(54) MODEL DRIVEN CONFIGURATION MANAGEMENT FOR MICROSERVICES

(71) Applicant: Juniper Networks, Inc., Sunnyvale, CA (US)

(72) Inventors: Chandrasekhar A, Bangalore (IN); Patricio Giecco, Upland, CA (US); Sri Sampath Mallipudi, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/887,015

(22) Filed: May 29, 2020

(65) Prior Publication Data

US 2021/0328863 A1    Oct. 21, 2021

(30) Foreign Application Priority Data

Apr. 16, 2020   (IN) .............................. 202041016447

(51) Int. Cl.
   *G06F 15/177*   (2006.01)
   *H04L 12/24*    (2006.01)

(52) U.S. Cl.
   CPC ................. *H04L 41/0803* (2013.01)

(58) Field of Classification Search
   CPC .................................................. H04L 41/0803
   USPC ...................................................... 709/220
   See application file for complete search history.

(56) References Cited

U.S. PATENT DOCUMENTS

| | | | | |
|---|---|---|---|---|
| 8,085,695 | B2 * | 12/2011 | Kushalnagar | H04L 67/34 370/310 |
| 10,013,275 | B2 * | 7/2018 | Vyas | G06F 9/5055 |
| 10,084,650 | B2 * | 9/2018 | Kristjansson | H04L 41/22 |
| 10,103,939 | B2 * | 10/2018 | Koponen | H04L 41/0816 |
| 10,291,462 | B1 * | 5/2019 | Joyce | H04L 41/046 |
| 10,326,657 | B1 * | 6/2019 | A | H04L 41/0843 |
| 10,341,221 | B2 * | 7/2019 | Eckert | H04L 69/22 |
| 10,374,884 | B2 * | 8/2019 | Dec | H04L 41/0893 |
| 10,462,000 | B2 * | 10/2019 | Balser | H04L 41/0843 |
| 10,541,938 | B1 | 1/2020 | Timmerman et al. | |
| 10,554,675 | B2 * | 2/2020 | Jain | H04L 67/2814 |
| 10,579,407 | B2 * | 3/2020 | Ahuja | G06F 9/45558 |
| 10,659,496 | B2 * | 5/2020 | Ahuja | H04L 63/1433 |
| 10,860,390 | B2 * | 12/2020 | Sukhomlinov | G06F 9/541 |

(Continued)

OTHER PUBLICATIONS

Extended European Search Report for Application No. EP21165222. 7, dated Aug. 25, 2021, 15 pages.

(Continued)

*Primary Examiner* — Alicia Baturay
(74) *Attorney, Agent, or Firm* — Harrity & Harrity, LLP

(57) ABSTRACT

A centralized configuration management system (CCM) may receive, from an NMS device, a request concerning a configuration for a microservice associated with the NMS device. The CCM may identify, based on the request, a first data model associated with default configuration information. The CCM may identify, based on the request, a second data model associated with customized configuration information. The CCM may generate, based on the first data model and the second data model, a response that includes at least one configuration parameter. The CCM may send the response to the NMS device to allow the microservice to be configured based on the at least one configuration parameter.

20 Claims, 11 Drawing Sheets

(56) References Cited

U.S. PATENT DOCUMENTS

| | | | |
|---|---|---|---|
| 10,873,533 B1* | 12/2020 | Ismailsheriff | H04L 47/2441 |
| 10,917,316 B2* | 2/2021 | Parthasarathy | H04L 41/5051 |
| 2011/0283232 A1* | 11/2011 | Jordan | H04N 21/47 715/810 |
| 2014/0156816 A1 | 6/2014 | Lopez Da Silva et al. | |
| 2019/0220289 A1 | 7/2019 | Driesen et al. | |
| 2019/0245743 A1 | 8/2019 | A et al. | |
| 2019/0268777 A1* | 8/2019 | Simon | H04W 28/24 |
| 2019/0273746 A1* | 9/2019 | Coffing | H04L 67/32 |
| 2019/0387406 A1* | 12/2019 | Goeringer | H04L 12/2825 |
| 2019/0394200 A1* | 12/2019 | Godier | H04L 9/321 |
| 2020/0059526 A1* | 2/2020 | Goeringer | H04L 41/0886 |
| 2020/0092254 A1* | 3/2020 | Goeringer | H04L 45/46 |
| 2020/0236009 A1* | 7/2020 | Meyer | H04L 41/5054 |
| 2020/0401457 A1* | 12/2020 | Singhal | G06F 9/445 |

OTHER PUBLICATIONS

Van, et al., "Container-Based Microservices SON Control Plane for Open Disaggregated Optical Networks," 2019 21st International Conference on Transparent Optical Networks(ICTON), IEEE, Jul. 2019, pp. 1-4, XP033618156.

* cited by examiner

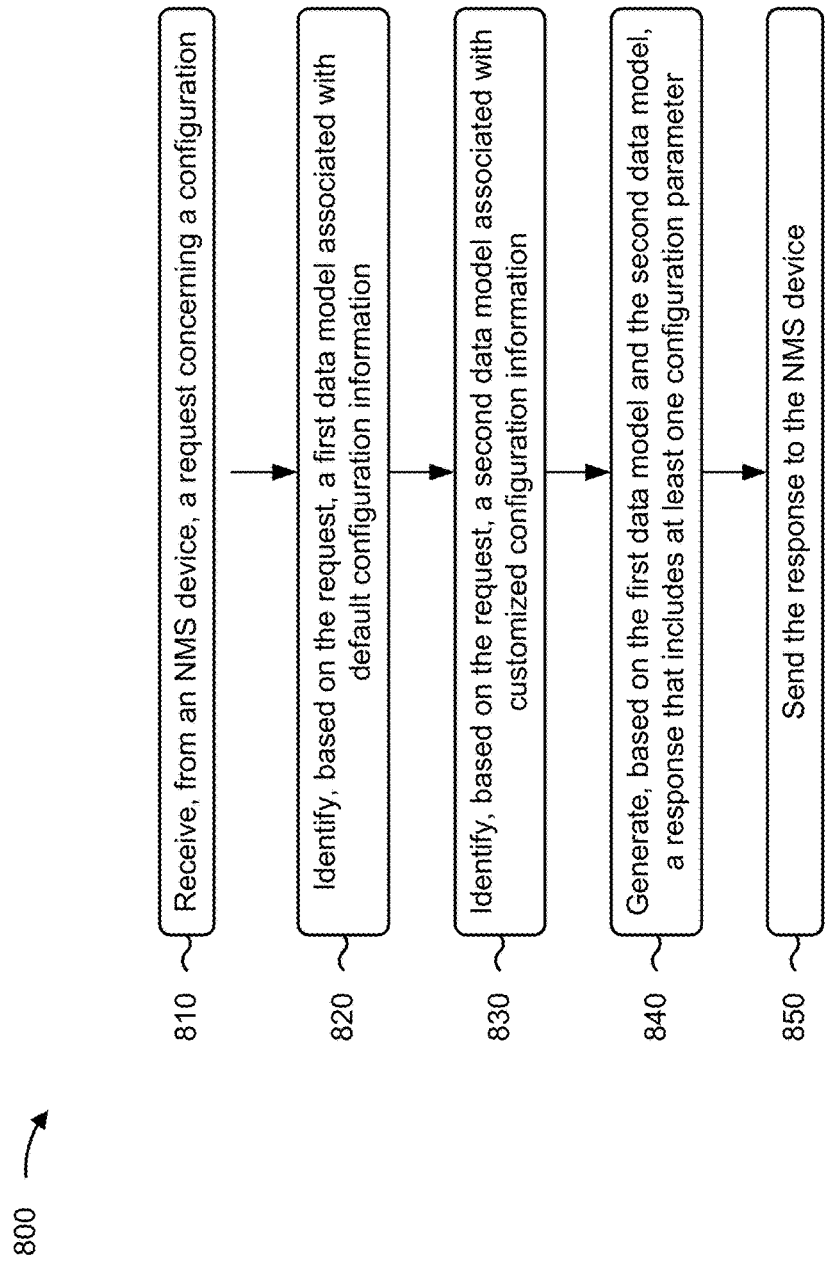

MODEL DRIVEN CONFIGURATION MANAGEMENT FOR MICROSERVICES

CROSS-REFERENCE TO RELATED APPLICATION

This application claims priority to Indian Provisional Application No. 202041016447 entitled "MODEL DRIVEN CONFIGURATION MANAGEMENT FOR MICROSERVICES," filed on Apr. 16, 2020. The entire content of which is expressly incorporated herein by reference.

BACKGROUND

The Network Configuration Protocol ("NETCONF") provides mechanisms to install, manipulate, and delete a configuration of network devices. The Yet Another Next Generation ("YANG") modelling language is a data modelling language for the NETCONF protocol, and represents data structures in a tree format. A network management system may use YANG data models to provision network devices via the NETCONF protocol. RESTCONF uses hypertext transfer protocol (HTTP) methods to provide create, read, update, and delete (CRUD) on a conceptual datastore containing YANG-defined data, which is compatible with a server that implements NETCONF datastores.

SUMMARY

According to some implementations, a method may include receiving, by a device and from an NMS device, a request concerning a configuration for a microservice associated with the NMS device; identifying, by the device and based on the request, a first data model associated with default configuration information; identifying, by the device and based on the request, a second data model associated with customized configuration information; generating, by the device and based on the first data model and the second data model, a response that includes at least one configuration parameter; and sending, by the device, the response to the NMS device to allow the microservice to be configured based on the at least one configuration parameter.

According to some implementations, a centralized configuration management system (CCM) may include one or more memories and one or more processors. In some implementations, the one or more processors are communicatively coupled to the one or more memories. The one or more processors may be configured to: identify a first data model associated with a default configuration group; generate, based on the first data model, a default configuration group file; receive a request concerning a configuration for a microservice associated with an NMS device; identify, based on the request, a second data model associated with default configuration information; identify, based on the request, a third data model associated with customized configuration information; generate, based on the second data model and the third data model, a response that includes at least one configuration parameter for the microservice associated with the NMS device; and send the response to the microservice associated with the NMS device.

According to some implementations, a non-transitory computer-readable medium may store one or more instructions. The one or more instructions, when executed by one or more processors of a CCM, may cause the one or more processors to: receive, from an NMS device, a request concerning a configuration; identify, based on the request, a first data model associated with default configuration information; identify, based on the request, a second data model associated with customized configuration information; generate, based on the first data model and the second data model, a response that includes at least one configuration parameter; and send the response to the NMS device.

BRIEF DESCRIPTION OF THE DRAWINGS

FIGS. 6-8 are flowcharts of example processes associated with model driven configuration management for microservices.

DETAILED DESCRIPTION

The following detailed description of example implementations refers to the accompanying drawings. The same reference numbers in different drawings may identify the same or similar elements.

A network management system (NMS) may include multiple microservices and a deployment may include one or more instances of the microservices. Often, a network administrator may manually interact with a client device to individually configure a microservice. However, this can be a resource intensive, time-consuming procedure that is susceptible to human error. For example, computing resources (e.g., processing resources, memory resources, power resources, and/or the like) of the client device may be expended to allow a network administrator to write programming code and/or to interact with a user interface of the client device to configure the microservice. These inefficiencies are multiplied when configuring tens, hundreds, thousands, and/or the like microservices. This can be applicable to providing a default configuration to the NMS as well.

Some implementations herein provide a centralized configuration management system (CCM) that receives a request concerning a configuration for a microservice associated with an NMS. The CCM may identify a data model associated with default configuration information (e.g., for an initial configuration of the microservice) and a data model associated with customized configuration information (e.g., for customizations to the initial configuration of the microservice). The CCM may generate, based on the data models, a response that includes at least one configuration parameter and may send the response to the microservice of the NMS to allow the microservice to be configured based on the at least one configuration parameter. Additionally, or alternatively, the CCM may identify a data model associated with a default configuration group and generate, based on the data model, a default configuration group file (e.g., that includes one or more configuration parameters). The NMS may obtain the default configuration from the CCM to allow a microservice associated with the default configuration group to be configured based on the default configuration.

In this way, the CCM may provide model driven configuration management for microservices and/or an NMS of a network. The CCM may configure the microservices without interacting with a network administrator (e.g., via a client device). Accordingly, the client device is not needed to configure the microservices, which conserves the computing resources (e.g., processing resources, memory resources, power resources, and/or the like) of the client device. Further, the CCM may reduce an amount of time to configure the microservices (e.g., by configuring the microservices in parallel), thereby improving a performance of the network relative to using a manual process to configure the microservices.

Figure 1A:
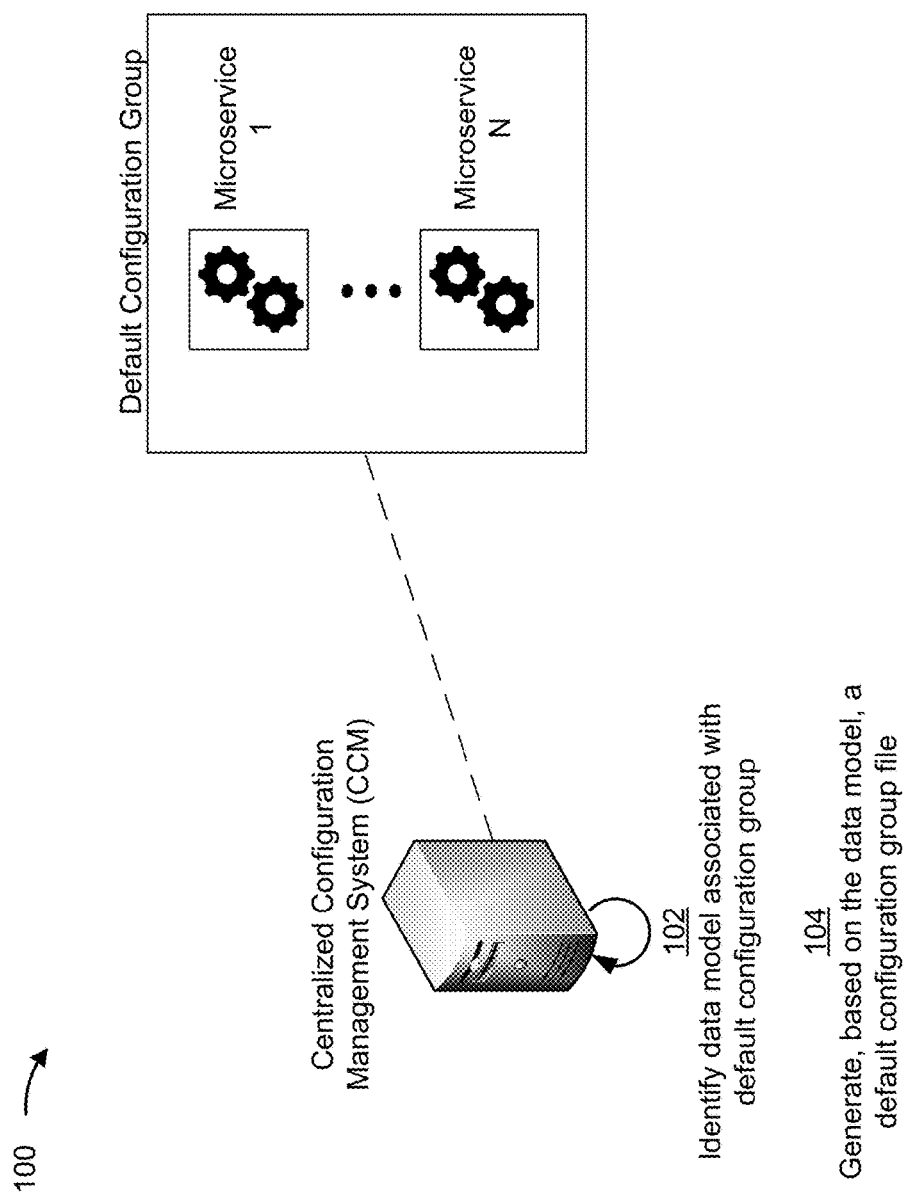
FIGS. 1A-1C are diagrams of one or more example implementations described herein.
Figure 1B:
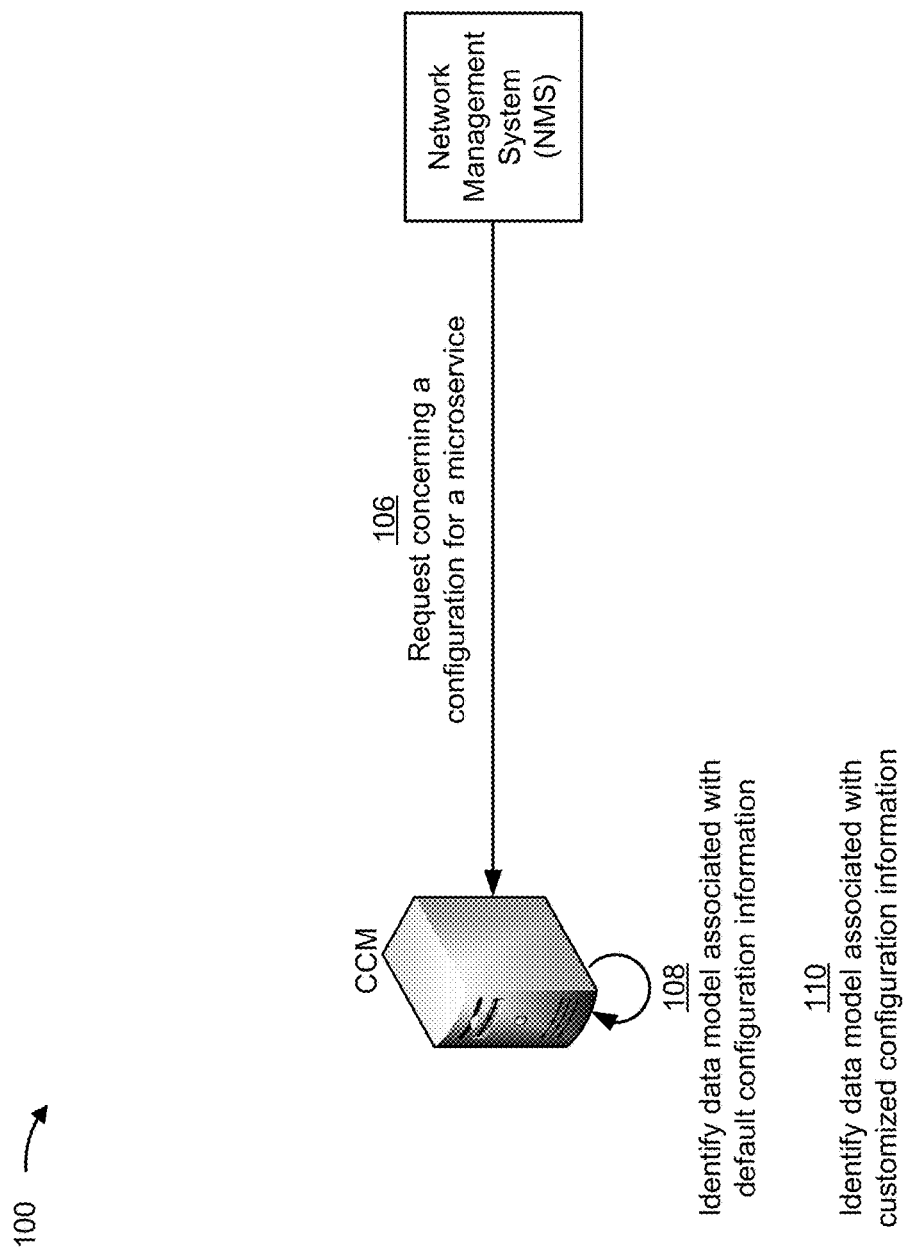
Figure 1C:
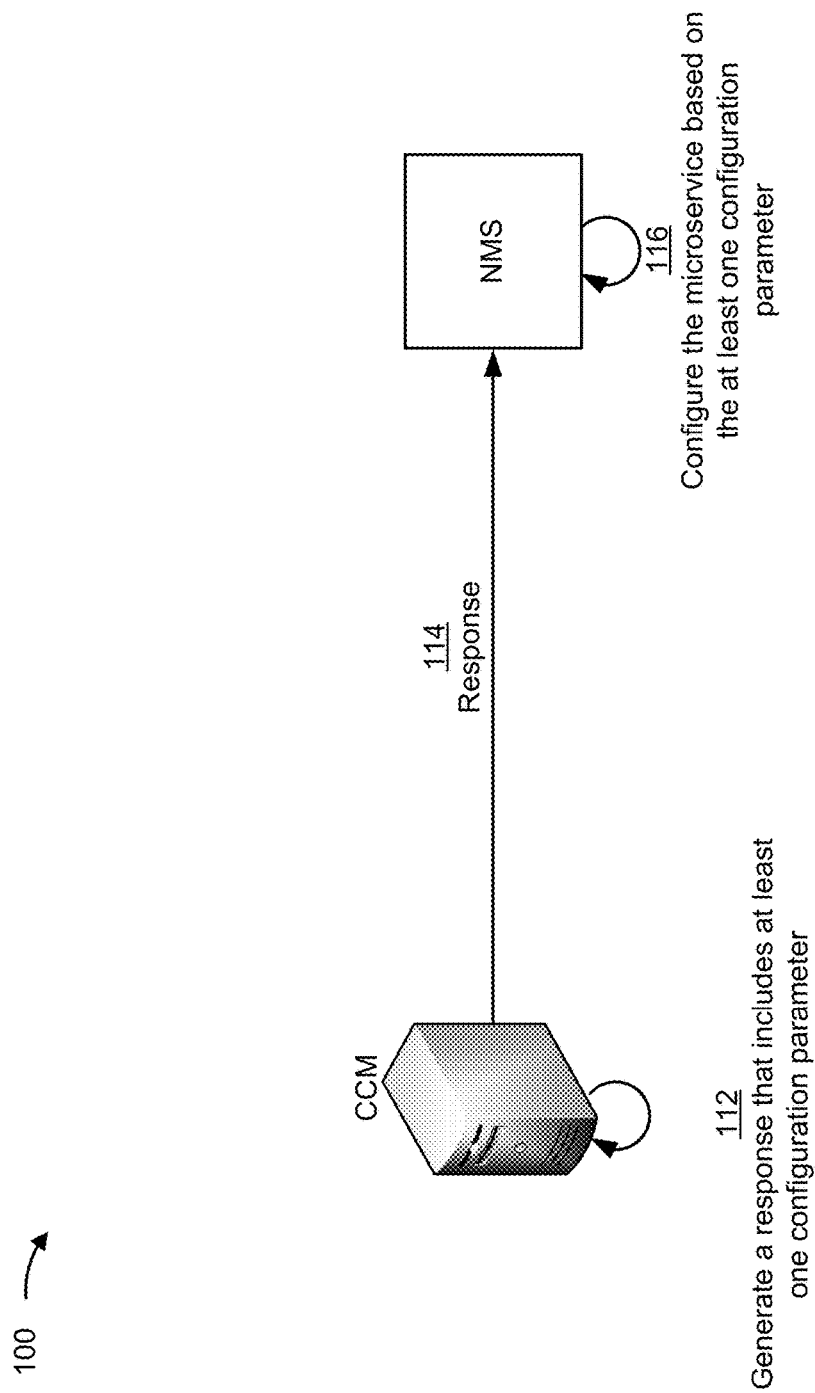

FIGS. 1A-1C are diagrams of an example implementation 100 described herein. As shown in FIGS. 1A-1C, example implementation 100 includes a CCM and/or an NMS. The CCM and/or the NMS may be included in a network.

As shown in FIG. 1A and reference number 102, the CCM may identify a first data model associated with a default configuration group (e.g., shown as including microservices 1 through N, where N is greater than 1). The CCM may identify the first data model to facilitate configuring the default configuration group. The first data model may be a tree-structured data model, such as a YANG data model. In some implementations, a user (e.g., a network administrator) may interact with a client device to generate and/or store the first data model in a data structure associated with the CCM (e.g., a data structure included in the CCM and/or accessible to the CCM).

As shown by reference number 104, the CCM may generate, based on the first data model, a default configuration group file (e.g., an extensible markup language (XML) file). The default configuration group file may include one or more configuration parameters to configure the microservices of the default configuration group. An example default configuration group file is described herein in relation to FIG. 2A.

In some implementations, the CCM may traverse the first data model to identify one or more constructs of the first data model. The CCM may identify, based on the one or more constructs, the one or more configuration parameters to include in the default configuration group file. For example, the CCM may identify a leaf (e.g., a leaf construct) of the first data model and may generate a leaf in the default configuration group file that includes a configuration parameter (e.g., a value) associated with the leaf of the first data model. As an additional example, the CCM may identify a derived type (e.g., a typedef construct) of the first data model and may generate a derived type in the default configuration group file that includes a configuration parameter associated with the derived type of the first data model. In a further example, the CCM may identify a list (e.g., a list construct) of the first data model and may add a wildcard expression (e.g., that may match any item in the list) associated with the list to the default configuration group file.

As another example, the CCM may identify a container (e.g., a container construct) of the first data model and one or more children (e.g., one or more child constructs) of the container. The CCM may determine whether at least one child, of the one or more children of the container, is associated with a configuration parameter. When the CCM determines that at least one child is associated with a configuration parameter, the CCM may add the container to the default configuration group file. Additionally, or alternatively, when the CCM determines that the at least one child is not associated with a configuration parameter, the CCM may not add the container to the default configuration group file.

In another example, the CCM may identify a choice (e.g., a choice construct) of the first data model. The CCM may determine that a case (e.g., a case construct) of the choice is a default case and may add one or more configuration parameters associated with the case to the default configuration group file. Additionally, or alternatively, the CCM may determine that a case of the choice includes one or more children (e.g., one or more child constructs) and that at least one child, of the one or more children, is associated with a default configuration parameter. The CCM may add the case and the at least one child to the default configuration group file.

As shown in FIG. 1B and by reference number 106, the NMS may send a request to the CCM. The request may be for a configuration, such as a request for a configuration for a microservice associated with the NMS (e.g., a microservice included in the NMS, a microservice instantiated by the NMS, and/or the like). For example, the NMS may send the request to the CCM when the microservice is deployed, initialized, and/or the like on the NMS.

In some implementations, the request may be a NETCONF message, a RESTCONF message, and/or the like and the NMS may send the request to the CCM via a NETCONF application programming interface (API), a RESTCONF API, and/or the like. The request may include information identifying the NMS, information identifying the microservice associated with the NMS, information indicating that the NMS has a capability to receive configuration information, information indicating that the request is a configuration request for the microservice, and/or the like. An example request is described herein in relation to FIG. 2B.

As shown by reference number 108, the CCM may identify a second data model associated with default configuration information based on receiving the request. For example, the CCM may process the request to identify the microservice associated with the NMS and to determine that the request is for a configuration for the microservice. The CCM may perform a lookup operation, based on identifying the microservice, in a data structure (e.g., that is included in the CCM and/or accessible to the CCM) that stores a group of data models (e.g., where each data model of the group of data models is associated with a microservice) to identify the second data model as being associated with default configuration information for the microservice. In some implementations, a user (e.g., a network administrator) may interact with a client device to generate and/or store the second data model in the data structure.

Additionally, or alternatively, as shown by reference number 110, the CCM may identify a third data model associated with customized configuration information based on receiving the request. For example, the CCM may process the request to identify the microservice associated with the NMS and to determine that the request is for a configuration for the microservice. The CCM may perform a lookup operation, based on identifying the microservice, in the data structure that stores the group of data models to identify the third data model as being associated with customized configuration information for the microservice. In some implementations, a user (e.g., a network administrator) may interact with a client device to generate and/or store the third data model in the data structure.

In some implementations, the second data model and the third data model may be tree-structured data models, such as a YANG data models. The second data model and the third data model may have similar or corresponding structures. For example, the second data model may have a hierarchical structure that corresponds to a hierarchical structure of the second data model (e.g., the second data model may have data model constructs in a similar position and hierarchy level as data model constructs of the third data model).

As shown in FIG. 1C and by reference number 112, the CCM may generate a response to the request. In some implementations, the response is a NETCONF message, a RESTCONF message, and/or the like. The response may include information indicating that the response is in response to the request, one or more configuration parameters (e.g., from the second data model and/or the third data model), and/or the like. An example response is described herein in relation to FIG. 2B.

In some implementations, the CCM may traverse the second data model to identify one or more constructs of the second data model and to identify one or more configuration parameters associated with the one or more constructs. The CCM may generate the response to include the one or more configuration parameters. For example, the CCM may traverse the second data model in a similar manner as described herein in relation to FIG. 1A and reference number 104 to identify one or more constructs of the second data model and one or more configuration parameters associated with the one or more constructs and may generate the response to include the one or more configuration parameters.

As another example, the CCM may identify a choice (e.g., a choice construct) of the second data model and may determine that a case (e.g., a case construct) of the choice of the second data model is a default case. The CCM may therefore generate the response to include one or more configuration parameters associated with the case. In some implementations, the CCM may determine that a case of the choice of the second data model is not a default case, but that the case includes one or more default configuration parameters (e.g., one or more default values of the case) and may therefore generate the response to include the one or more default configuration parameters. Additionally, or alternatively, the CCM may determine that a case of the choice is not a default case and does not include a default configuration parameter. The CCM therefore may generate the response to not include any configuration parameter associated with the case.

As an additional example, the CCM may identify a conditional statement (e.g., an if-feature construct) of the second data model. The CCM and may determine that the conditional statement is satisfied (e.g., when a feature of the second data model satisfies the if-feature construct) and may therefore generate the response to include one or more configuration parameters associated with the conditional statement. Additionally, or alternatively, the CCM may determine that the conditional statement is not satisfied (e.g., when a feature of the second data model does not satisfy the if-feature construct) and may therefore generate the response to not include any configuration parameter associated with the conditional statement.

In some implementations, when the second data model and the third data model have similar or corresponding structures, the CCM may traverse the second data model and the third data model (e.g., in parallel) to identify whether one or more corresponding constructs exist in the second data model and the third data model.

In some implementations, the CCM may determine that a construct exists in the second data model and that a corresponding construct does not exist in the third data model. The CCM may therefore generate the response to include one or more configuration parameters (e.g., one or more construct values) associated with the construct of the second data model in the response. For example, the CCM may identify a leaf (e.g., a leaf construct) of the second data model and may determine that the third data model does not include a leaf that corresponds to the leaf of the second data model. The CCM may therefore generate the response to include a configuration parameter associated with the leaf of the second data model. As another example, the CCM may identify a list (e.g., a list construct) of the second data model (e.g., that includes one or more list elements) and may determine that a corresponding list of the third data model does not exist. The CCM may therefore generate the response to include a list that includes the one or more list elements of the list of the second data model.

In some implementations, the CCM may determine that a construct exists in the second data model and that a corresponding construct exists in the third data model and may therefore generate the response to include one or more configuration parameters associated with the construct of the second data model and one or more configuration parameters associated with the construct of the third data model. For example, the CCM may identify a list (e.g., a list construct) of the second data model (e.g., that includes one or more list elements) and a corresponding list of the third data model (e.g., that includes one or more list elements). The CCM may therefore generate the response to include a list that includes the one or more list elements of the list of the second data model and the one or more list elements of the list of the third data model.

Additionally, or alternatively, the CCM may determine that a construct exists in the second data model and that a corresponding construct exists in the third data model and may therefore generate the response to include one or more configuration parameters associated with the construct of third data model and not one or more configuration parameters associated with the construct of the second data model (e.g., because the one or more configuration parameters associated with the customized configuration information overwrite the one or more configuration parameters associated with the default configuration information). For example, the CCM may identify a leaf of the second data model and a corresponding leaf of the third data model and may therefore generate the response to include only one or more configuration parameters associated with the leaf of the third data model.

In some implementations, the CCM may generate a response that includes information indicating that the request cannot be completed. For example, the CCM may not be able to identify a data model associated with default configuration information (e.g., as described above in reference to FIG. 1B and reference number 108). The CCM may therefore generate the response to indicate that a data model associated with default configuration information is not available. As another example, the CCM may encounter an error attempting to traverse the second model and/or the third model. The CCM may therefore generate the response to indicate that the CCM experienced an error.

As shown by reference number 114, the CCM may send the response to the NMS (e.g., in response to the request sent by the NMS to the CCM). In some implementations, the CCM may send the response to the NMS via a NETCONF API, a RESTCONF API, and/or the like.

In some implementations, when the response includes one or more configuration parameters, the NMS may apply the one or more configuration parameters of the response to the microservice associated with the NMS. For example, as shown by reference number 116, the NMS may process the response to allow the microservice to be configured based on the one or more configuration parameters in the response.

In some implementations, when the response includes information indicating that the request cannot be completed, the NMS may cease attempting to configure the microservice associated with the NMS. Additionally, or alternatively, the NMS may resend the request to the CCM to attempt to receive an additional response from the CCM that includes one or more configuration parameters that the NMS may apply to the microservice.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
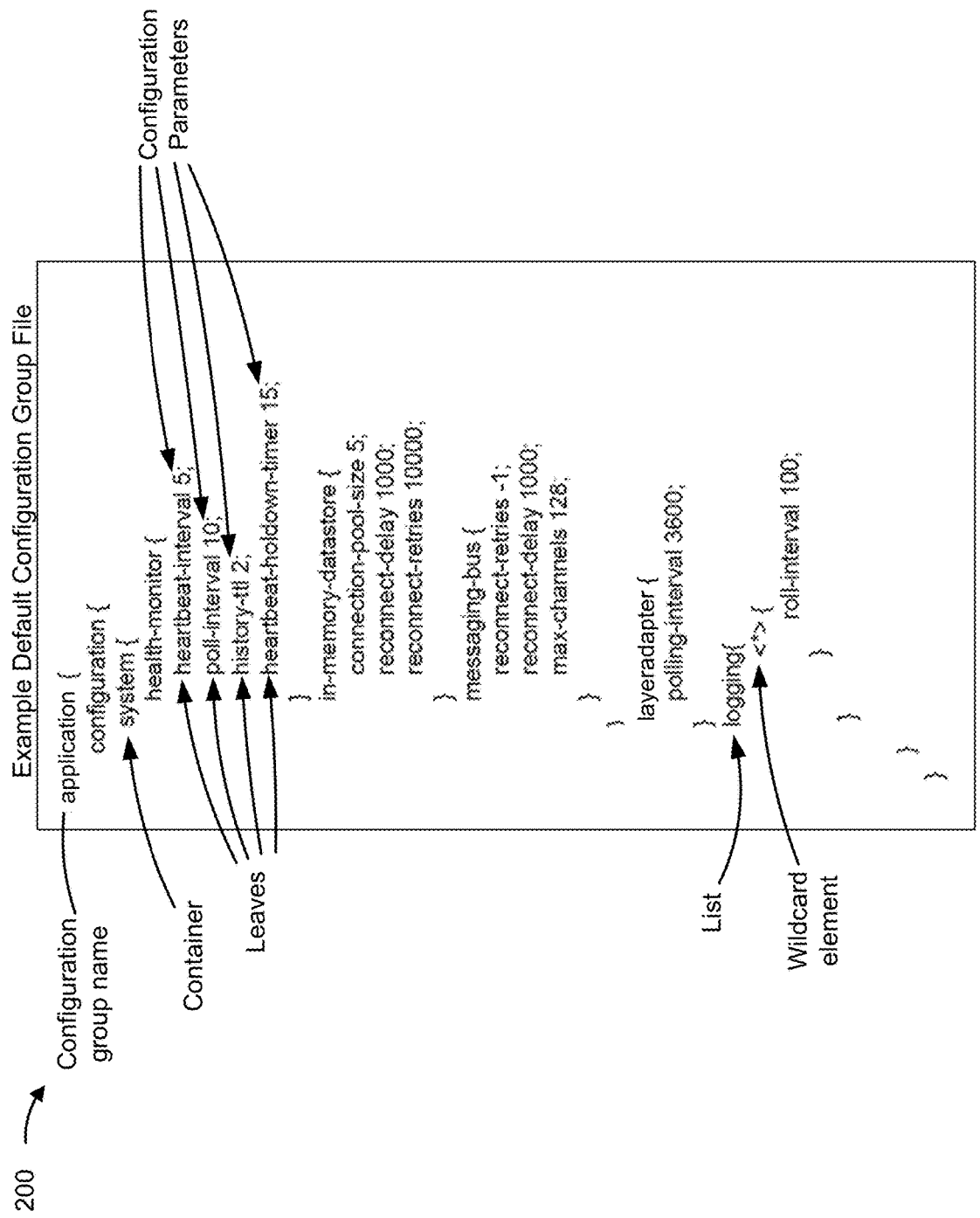
FIGS. 2A-2B are diagrams of an example default configuration group file, an example request, and an example response described herein.
Figure 2B:
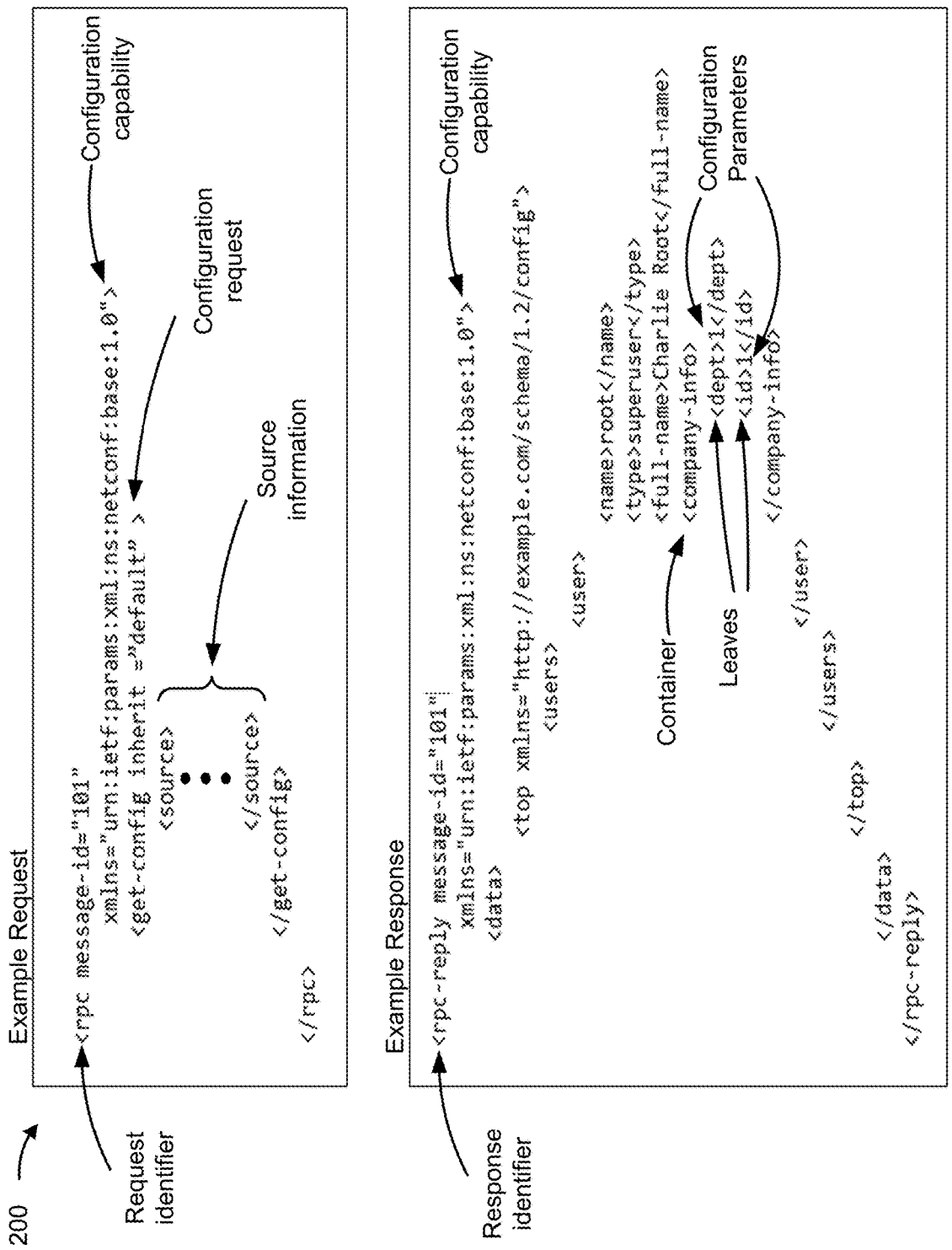

FIGS. 2A-2B depict an example default configuration group file, an example request, and an example response described herein. As shown in FIG. 2A, the example default configuration group file includes a plurality of constructs. For example, the example default configuration group file includes a configuration group name construct (shown as application), a container construct (shown as system), a plurality of leaves with respective configuration parameters (shown as heartbeat-interval 5; poll-interval 10; history-ttl 2; and heartbeat-holddown-timer 15), a list construct (shown as logging) with a wildcard element (shown as <*>), as well as other constructs.

As shown in FIG. 2B, the example request includes a request identifier (shown as <rpc message-id="101"), a configuration capability (shown as xmlns="urn:ietfparams:xml:ns:netconfbase:1.0">), a configuration request (shown as <get-config inherit="default">), and source information that may indicate the NMS sending the request and/or a microservice associated with the NMS that is requested to be configured (shown as <source> ... </source>). As described above, the example request may be a NETCONF message, a RESTCONF message, and/or the like. As further shown in FIG. 2B, the example response includes a response identifier that indicates that the example response is in response to the example request (shown as <rpc-reply message-id="101"), a configuration capability (shown as xmlns="urn:ietfparams:xml:ns:netconfbase:1.0">), and a plurality of constructs, such as a container (shown as <company-information>) and a plurality of leaves with respective configuration parameters (shown as <dept>1</dept> and <id>1</id>). As described above, the example response may be a NETCONF message, a RESTCONF message, and/or the like.

As indicated above, FIGS. 2A-2B are provided merely as one or more examples. Other examples may differ from what is described with regard to FIGS. 2A-2B.

Figure 3:
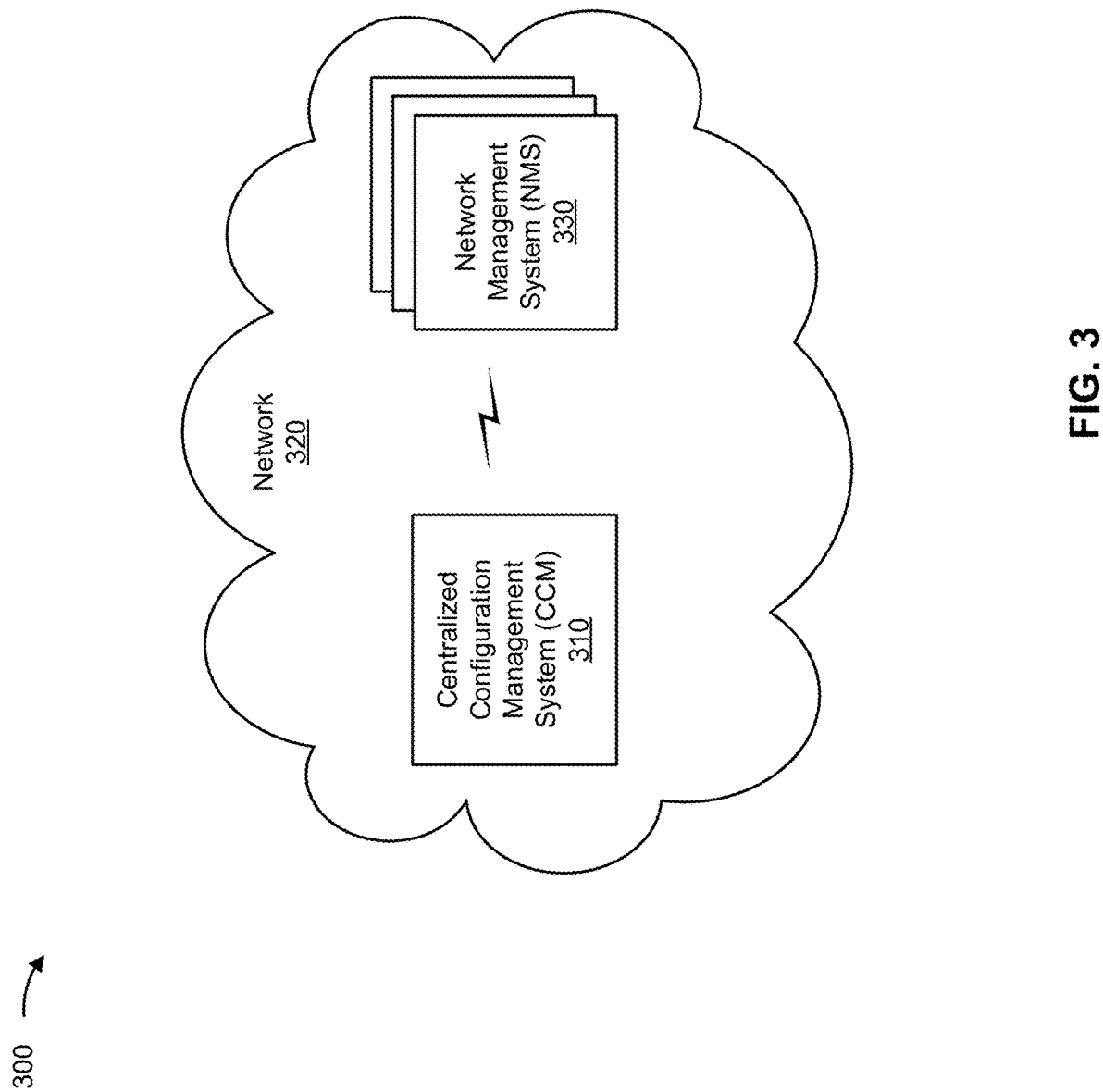
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 include a CCM 310, a network 320, and an NMS 330. Devices of environment 200 may interconnect via wired connections, wireless connections, or a combination of wired and wireless connections.

CCM 310 includes one or more devices capable of receiving, generating, storing, processing, and/or providing information, such as information described herein. For example, CCM 310 may include a communication device and/or a computing device. For example, the CCM 310 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The CCM 310 may communicate with one or more other devices of environment 300, as described elsewhere herein.

Network 320 includes one or more wired and/or wireless networks. For example, network 320 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

NMS 330 includes one or more devices capable of receiving, generating, storing, processing, providing, and/or routing information associated with configuring a microservice associated with NMS 330. NMS 330 may include a communication device and/or a computing device. For example, the server device 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. In some implementations, NMS device 330 may be a physical device implemented within a housing, such as a chassis. In some implementations, NMS device 330 may be a virtual device implemented by one or more computer devices of a cloud computing environment or a data center. NMS 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
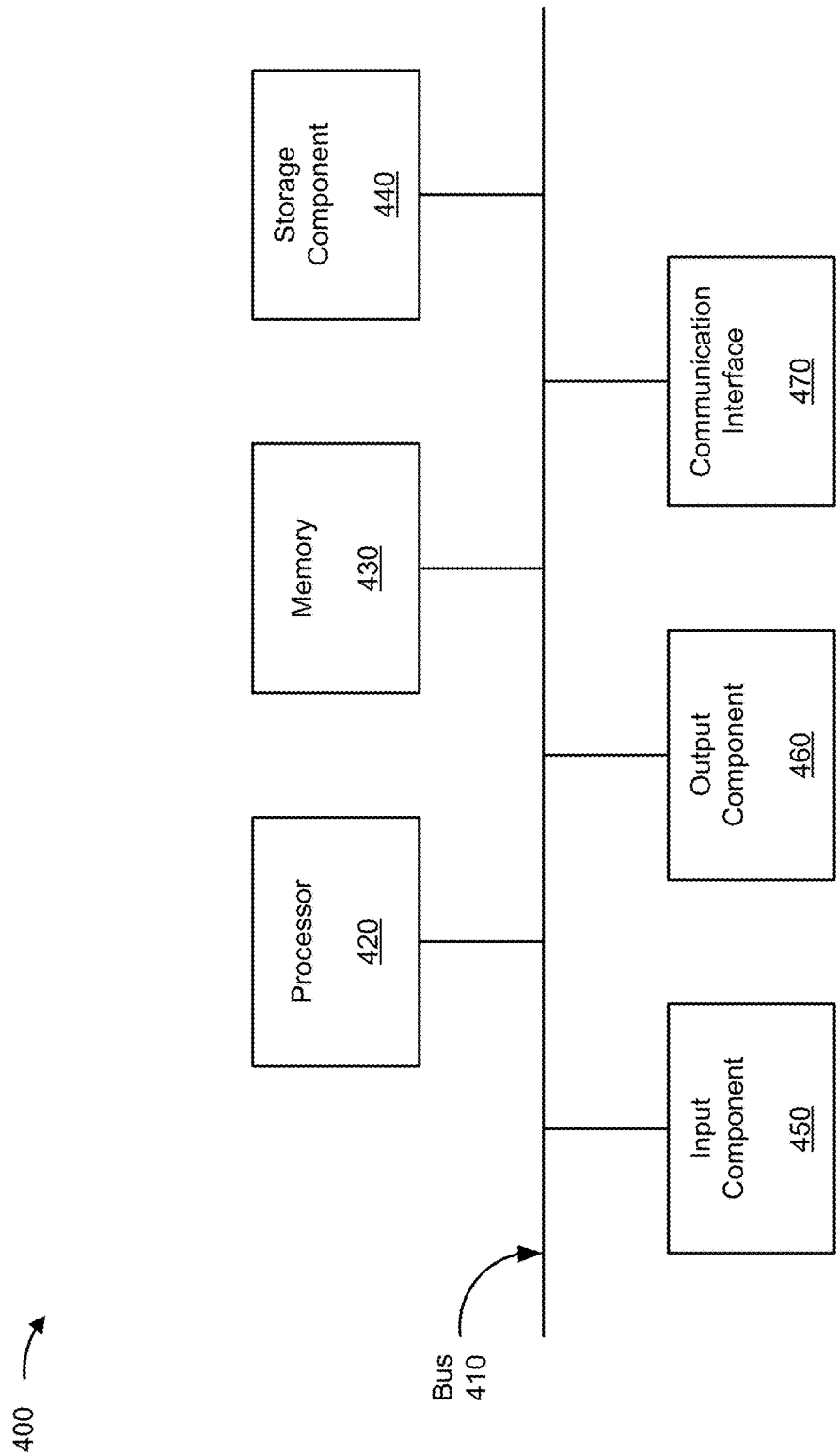
FIGS. 4 and 5 are diagrams of example components of one or more devices of FIG. 3.

FIG. 4 is a diagram of example components of a device 400. Device 400 may correspond to CCM 310 and/or NMS 330. In some implementations, CCM 310 and/or NMS 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
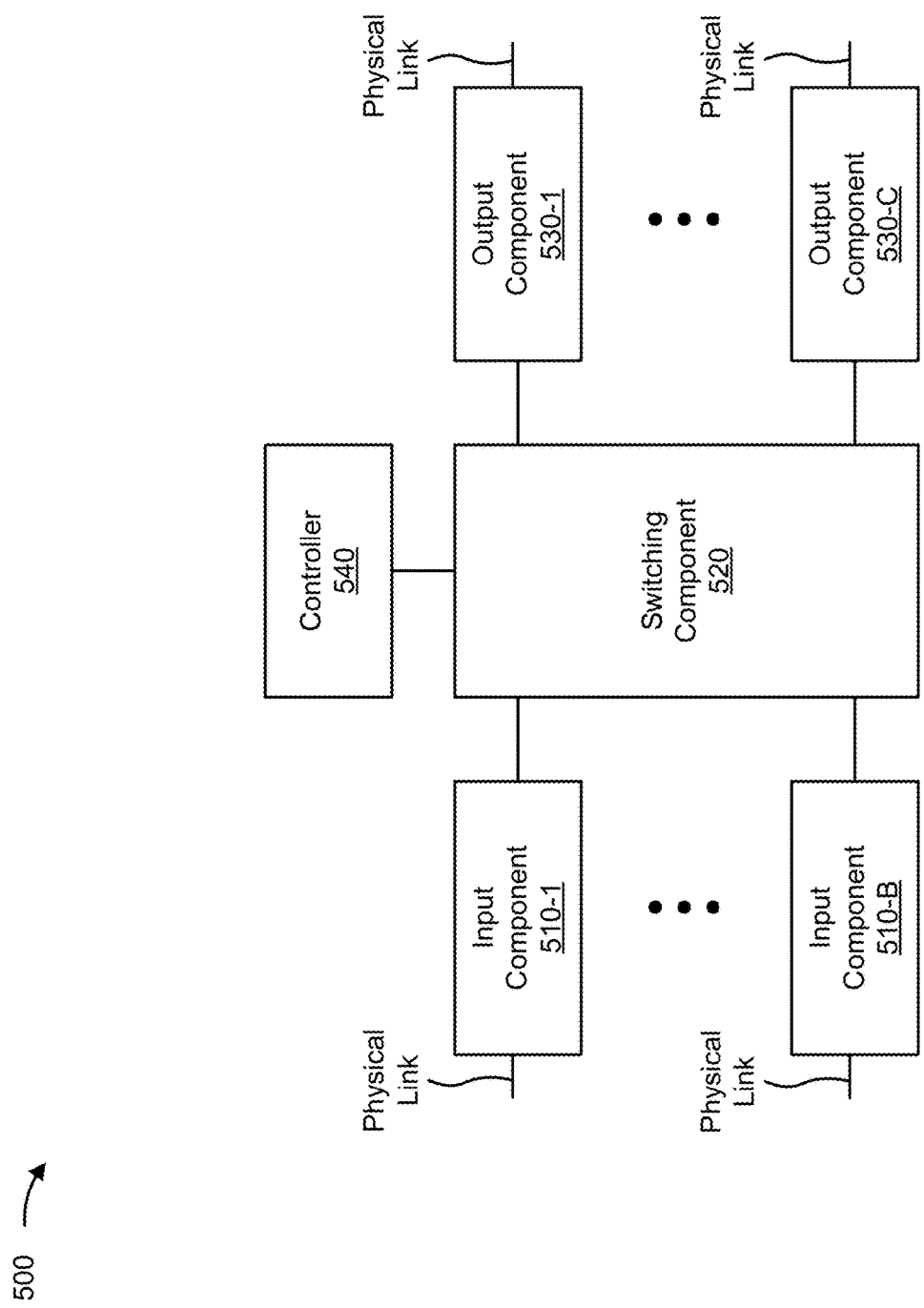

FIG. 5 is a diagram of example components of a device 500. Device 500 may correspond to CCM 310, NMS 330, and/or the like. In some implementations, CCM 310, NMS 330, and/or the like may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
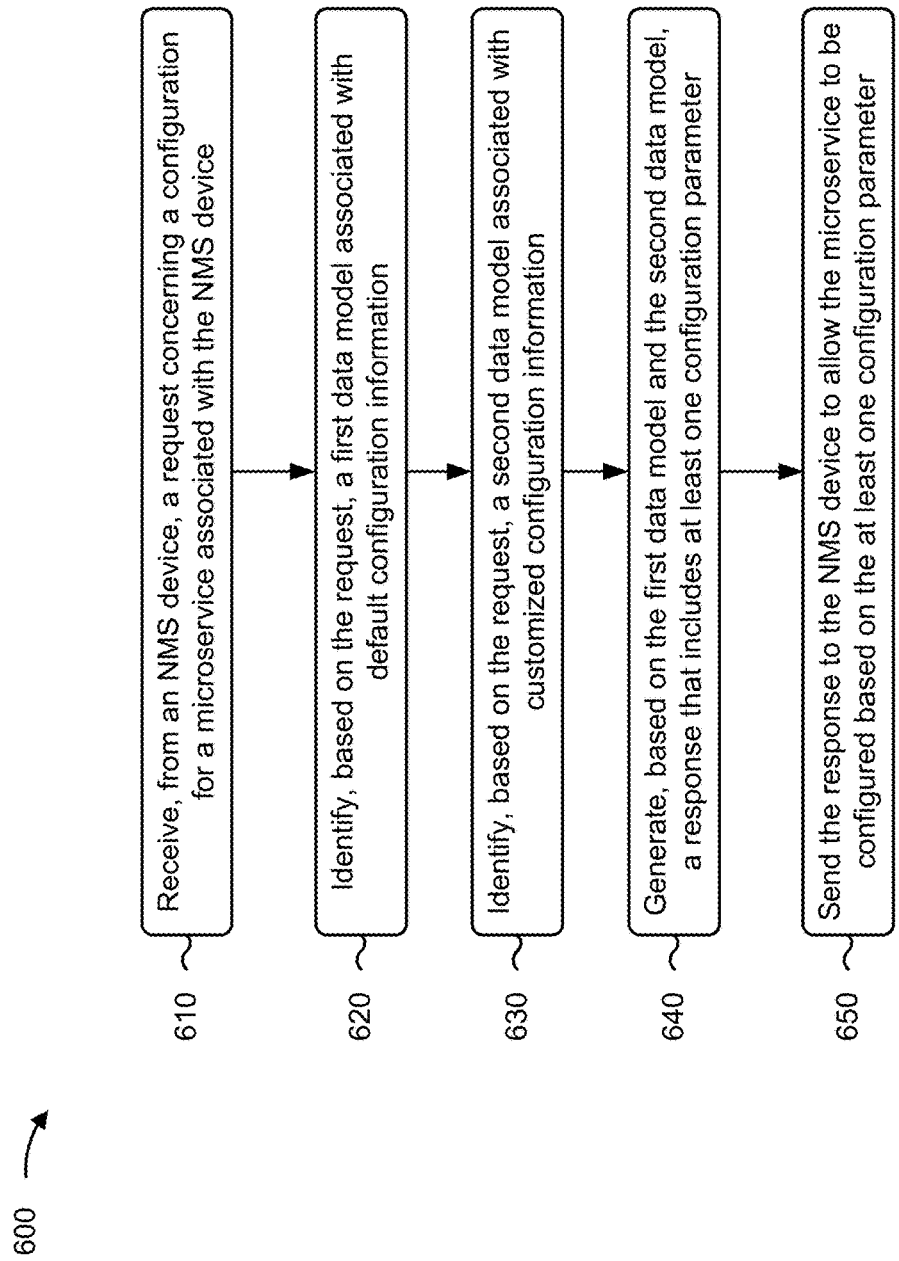

FIG. 6 is a flowchart of an example process 600 associated with model driven configuration management for microservices. In some implementations, one or more process blocks of FIG. 6 may be performed by a device (e.g., CCM 310). In some implementations, one or more process blocks of FIG. 6 may be performed by another device or a group of devices separate from or including the device, such as an NMS device (e.g., NMS 330), and/or the like.

As shown in FIG. 6, process 600 may include receiving, from an NMS device, a request concerning a default configuration for a microservice associated with the NMS device (block 610). For example, the device (e.g., using processor 420, memory 430, storage component 440, input component 450, output component 460, communication interface 470, and/or the like) may receive, from an NMS device, a request concerning a default configuration for a microservice associated with the NMS device, as described above.

As further shown in FIG. 6, process 600 may include identifying, based on the request, a first data model associated with default configuration information (block 620). For example, the device (e.g., using processor 420, memory 430, storage component 440, input component 450, output component 460, communication interface 470, and/or the like) may identify, based on the request, a first data model associated with default configuration information, as described above.

As further shown in FIG. 6, process 600 may include identifying, based on the request, a second data model associated with customized configuration information (block 630). For example, the device (e.g., using processor 420, memory 430, storage component 440, input component 450, output component 460, communication interface 470, and/or the like) may identify, based on the request, a second data model associated with customized configuration information, as described above.

As further shown in FIG. 6, process 600 may include generating, based on the first data model and the second data model, a response that includes at least one configuration parameter (block 640). For example, the device (e.g., using processor 420, memory 430, storage component 440, input component 450, output component 460, communication interface 470, and/or the like) may generate, based on the first data model and the second data model, a response that includes at least one configuration parameter, as described above.

As further shown in FIG. 6, process 600 may include sending the response to the NMS device to allow the microservice to be configured based on the at least one configuration parameter (block 650). For example, the device (e.g., using processor 420, memory 430, storage component 440, input component 450, output component 460, communication interface 470, and/or the like) may send the response to the NMS device to allow the microservice to be configured based on the at least one configuration parameter, as described above.

Process 600 may include additional implementations, such as any single implementation or any combination of implementations described below and/or in connection with one or more other processes described elsewhere herein.

In a first implementation, the device receives the request and sends the response via a NETCONF application programming interface.

In a second implementation, alone or in combination with the first implementation, the first data model and the second data model are stored as respective YANG data models in a data structure associated with the device.

In a third implementation, alone or in combination with one or more of the first and second implementations, generating the response that includes the at least one configuration parameter comprises: identifying a leaf of the first data model; determining that the second data model does not include a leaf that corresponds to the leaf of the first data model, and generating, based on identifying the leaf of the first data model and determining that the second data model does not include a leaf that corresponds to the leaf of the first data model, the response to include a configuration parameter associated with the leaf of the first data model.

In a fourth implementation, alone or in combination with one or more of the first through third implementations, generating the response that includes the at least one configuration parameter comprises identifying a leaf of the first data model and a corresponding leaf of the second data model, and generating, based on identifying the leaf of the first data model and the corresponding leaf of the second data model, the response to include a configuration parameter associated with the corresponding leaf of the second data model and not a configuration parameter associated with the leaf of the first data model.

In a fifth implementation, alone or in combination with one or more of the first through fourth implementations, generating the response that includes the at least one configuration parameter comprises identifying a list of the first data model and a corresponding list of the second data model and generating, based on identifying the list of the first data model and the corresponding list of the second data model, the response to include a configuration parameter list that includes at least one element of the list of the first data model and at least one element of the list of the second data model.

In a sixth implementation, alone or in combination with one or more of the first through fifth implementations, generating the response that includes the at least one configuration parameter comprises identifying a choice of the first data model; determining, based on identifying the choice of the first data model, a case of the choice of the first data model is a default case; and generating, based on determining that the case of the choice of the first data model is a default case, the response to include a plurality of configuration parameters associated with the case.

In a seventh implementation, alone or in combination with one or more of the first through sixth implementations, generating the response that includes the at least one configuration parameter comprises identifying a choice of the first data model and a case of the choice of the first data model; and generating, based on identifying the choice of the first data model and the case of the choice of the first data model, the response to include one or more configuration parameters associated with the choice.

In an eighth implementation, alone or in combination with one or more of the first through seventh implementations, generating the response that includes the at least one configuration parameter comprises identifying a conditional statement of the first data model; determining that the conditional statement is satisfied, and generating, based on determining that the conditional statement is satisfied, the response to include a configuration parameter associated with the conditional statement.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
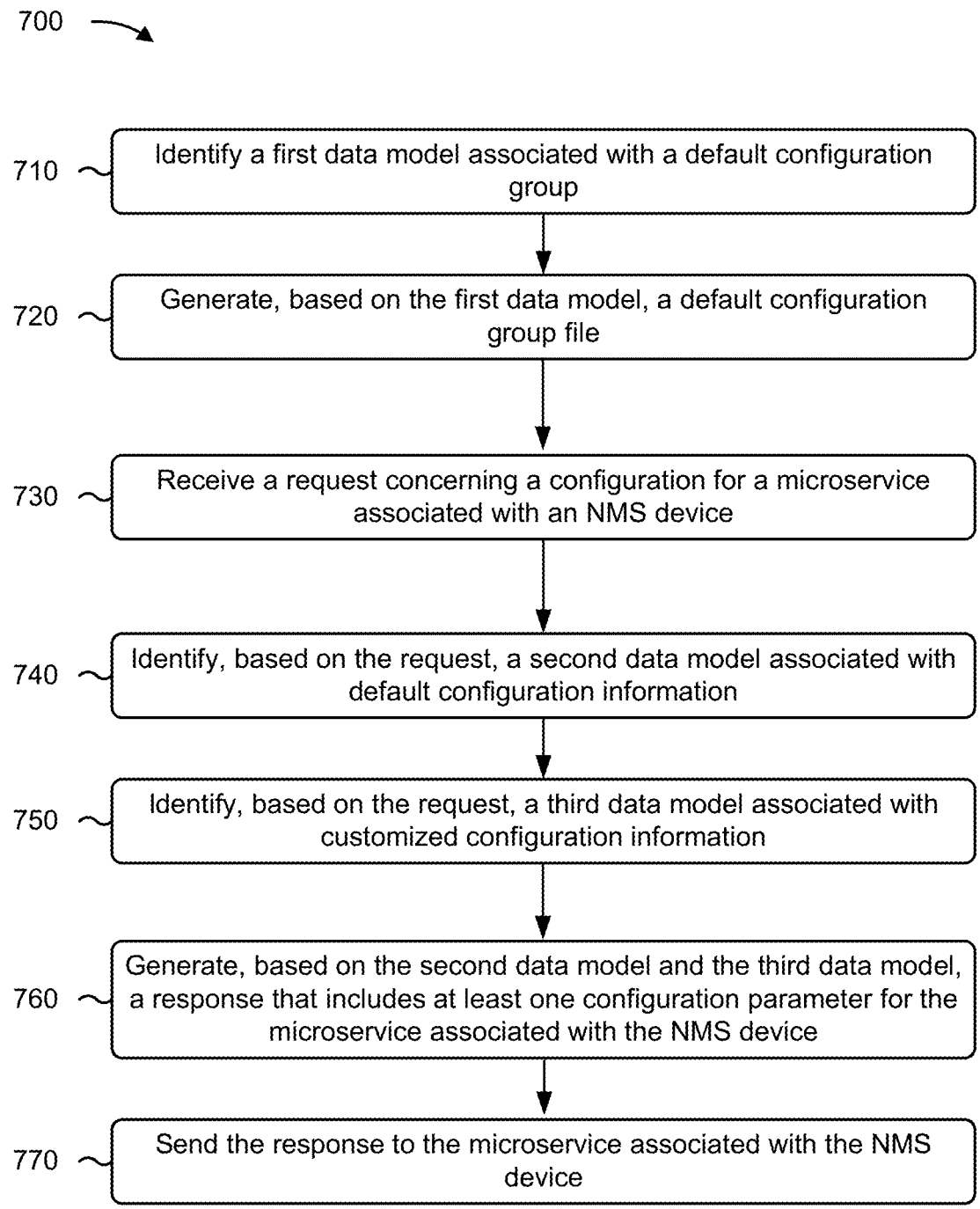

FIG. 7 is a flowchart of an example process 700 associated with model driven configuration management for microservices. In some implementations, one or more process blocks of FIG. 7 may be performed by a device (e.g., CCM 310). In some implementations, one or more process blocks of FIG. 7 may be performed by another device or a group of devices separate from or including the device, such as a NMS device (e.g., NMS 330), and/or the like.

As shown in FIG. 7, process 700 may include identifying a first data model associated with a default configuration group (block 710). For example, the device (e.g., using processor 420, memory 430, storage component 440, input component 450, output component 460, communication interface 470, and/or the like) may identify a first data model associated with a default configuration group, as described above.

As further shown in FIG. 7, process 700 may include generating, based on the first data model, a default configuration group file (block 720). For example, the device (e.g., using processor 420, memory 430, storage component 440, input component 450, output component 460, communication interface 470, and/or the like) may generate, based on the first data model, a default configuration group file, as described above.

As further shown in FIG. 7, process 700 may include receiving a request concerning a configuration for a microservice associated with an NMS device (block 730). For example, the device (e.g., using processor 420, memory 430, storage component 440, input component 450, output component 460, communication interface 470, and/or the like) may receive a request concerning a configuration for a microservice associated with an NMS device, as described above.

As further shown in FIG. 7, process 700 may include identifying, based on the request, a second data model associated with default configuration information (block 740). For example, the device (e.g., using processor 420, memory 430, storage component 440, input component 450, output component 460, communication interface 470, and/or the like) may identify, based on the request, a second data model associated with default configuration information, as described above.

As further shown in FIG. 7, process 700 may include identifying, based on the request, a third data model associated with customized configuration information (block 750). For example, the device (e.g., using processor 420, memory 430, storage component 440, input component 450, output component 460, communication interface 470, and/or the like) may identify, based on the request, a third data model associated with customized configuration information, as described above.

As further shown in FIG. 7, process 700 may include generating, based on the second data model and the third data model, a response that includes at least one configuration parameter for the microservice associated with the NMS device (block 760). For example, the device (e.g., using processor 420, memory 430, storage component 440, input component 450, output component 460, communication interface 470, and/or the like) may generate, based on the second data model and the third data model, a response that includes at least one configuration parameter for the microservice associated with the NMS device, as described above.

As further shown in FIG. 7, process 700 may include sending the response to the microservice associated with the NMS device (block 770). For example, the device (e.g., using processor 420, memory 430, storage component 440, input component 450, output component 460, communication interface 470, and/or the like) may send the response to the microservice associated with the NMS device, as described above.

Process 700 may include additional implementations, such as any single implementation or any combination of implementations described below and/or in connection with one or more other processes described elsewhere herein.

In a first implementation, the request is a NETCONF message or a RESTCONF message.

In a second implementation, alone or in combination with the first implementation, the first data model, the second data model, and the third data model are tree-structured data models.

In a third implementation, alone or in combination with one or more of the first and second implementations, process 700 includes identifying a leaf of the first data model and generating the default configuration group file includes generating a leaf in the default configuration group file that includes a configuration parameter associated with the leaf of the first data model.

In a fourth implementation, alone or in combination with one or more of the first through third implementations, process 700 includes identifying a container of the first data model and determining that a child, of one or more children of the container, is associated with a configuration parameter, wherein generating the default configuration group file includes adding the container to the default configuration group file.

In a fifth implementation, alone or in combination with one or more of the first through fourth implementations, process 700 includes identifying a list of the first data model and generating the default configuration group file includes adding a wildcard expression associated with the list to the default configuration group file.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flowchart of an example process 800 associated with model driven configuration management for microservices. In some implementations, one or more process blocks of FIG. 8 may be performed by a device (e.g., CCM 310). In some implementations, one or more process blocks of FIG. 8 may be performed by another device or a group of devices separate from or including the device, such as a NMS device (e.g., NMS 330), and/or the like.

As shown in FIG. 8, process 800 may include receiving, from an NMS device, a request concerning a default configuration (block 810). For example, the device (e.g., using processor 420, memory 430, storage component 440, input component 450, output component 460, communication interface 470, and/or the like) may receive, from an NMS device, a request concerning a default configuration, as described above.

As further shown in FIG. 8, process 800 may include identifying, based on the request, a first data model associated with default configuration information (block 820). For example, the device (e.g., using processor 420, memory 430, storage component 440, input component 450, output component 460, communication interface 470, and/or the like) may identify, based on the request, a first data model associated with default configuration information, as described above.

As further shown in FIG. 8, process 800 may include identifying, based on the request, a second data model associated with customized configuration information (block 830). For example, the device (e.g., using processor 420, memory 430, storage component 440, input component 450, output component 460, communication interface 470, and/or the like) may identify, based on the request, a second data model associated with customized configuration information, as described above.

As further shown in FIG. 8, process 800 may include generating, based on the first data model and the second data model, a response that includes at least one configuration parameter (block 840). For example, the device (e.g., using processor 420, memory 430, storage component 440, input component 450, output component 460, communication interface 470, and/or the like) may generate, based on the first data model and the second data model, a response that includes at least one configuration parameter, as described above.

As further shown in FIG. 8, process 800 may include sending the response to the NMS device (block 850). For example, the device (e.g., using processor 420, memory 430, storage component 440, input component 450, output component 460, communication interface 470, and/or the like) may send the response to the NMS device, as described above.

Process 800 may include additional implementations, such as any single implementation or any combination of implementations described below and/or in connection with one or more other processes described elsewhere herein.

In a first implementation, the request and the response are NETCONF messages.

In a second implementation, alone or in combination with the first implementation, the first data model and the second data model are YANG data models.

In a third implementation, alone or in combination with one or more of the first and second implementations, the first data model has a hierarchical structure that corresponds to a hierarchical structure of the second data model.

In a fourth implementation, alone or in combination with one or more of the first through third implementations, process 800 includes identifying a third data model associated with a default configuration group and generating, based on the third data model, a default configuration group file.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a network management system (NMS) device, a request concerning a configuration for a microservice associated with the NMS device;
identifying, by the device and based on the request, a first data model associated with default configuration information,
wherein the first data model is used to provide an initial configuration of the microservice, and
wherein the first data model includes a first hierarchical structure having a first set of constructs;
identifying, by the device and based on the request, a second data model associated with customized configuration information,
wherein the second data model is used to provide a customization to the initial configuration of the microservice, and
wherein the second data model includes a second hierarchical structure having a second set of constructs;
traversing, by the device, the first data model and the second data model to identify a configuration parameter that corresponds to at least one of a first construct of the first set of constructs or a second construct of the second set of constructs;
generating, by the device and based on traversing the first data model and the second data model, a response that includes the configuration parameter; and
sending, by the device, the response to the NMS device to allow the microservice to be configured based on the configuration parameter.

2. The method of claim 1, wherein the device receives the request and sends the response via a Network Configuration Protocol (NETCONF) application programming interface, and
wherein the request includes information indicating a configuration capability of the microservice and a configuration request for the microservice.

3. The method of claim 1, wherein the first data model and the second data model are stored as respective Yet Another Next Generation (YANG) data models in a data structure associated with the device.

4. The method of claim 1, wherein generating the response comprises:
identifying a first leaf of the first data model,
wherein the first leaf constitutes the first construct;
determining that the second data model does not include a second leaf that corresponds to the first leaf of the first data model; and
generating, based on identifying the first leaf of the first data model and determining that the second data model does not include the second leaf that corresponds to the first leaf of the first data model, the response to include the configuration parameter,
wherein the configuration parameter is associated with the first leaf of the first data model.

5. The method of claim 1, wherein generating the response comprises:
identifying a first leaf of the first data model and a corresponding second leaf of the second data model,
wherein the first leaf constitutes the first construct, and the corresponding second leaf constitutes the second construct; and
generating, based on identifying the first leaf of the first data model and the corresponding second leaf of the second data model, the response to include the configuration parameter and not a configuration parameter associated with the first leaf of the first data model,
wherein the configuration parameter is associated with the corresponding leaf of the second data model.

6. The method of claim 1, wherein generating the response comprises:
identifying a first list of the first data model and a corresponding second list of the second data model,
wherein the first list constitutes a third construct, of the first set of constructs, and the corresponding second list constitutes a fourth construct, of the second set of constructs; and
generating, based on identifying the first list of the first data model and the second corresponding list of the second data model, the response to further include a configuration parameter list that includes at least one element of the first list of the first data model and at least one element of the second list of the second data model.

7. The method of claim 1, wherein generating the response comprises:
identifying a choice of the first data model;
determining, based on identifying the choice of the first data model, that a case of the choice is a default case,
wherein the case of the choice constitutes the first construct; and
generating, based on determining that the case of the choice is the default case, the response to include a plurality of configuration parameters associated with the case,
wherein the plurality of configuration parameters includes the configuration parameter.

8. The method of claim 1, wherein generating the response comprises:
identifying a choice of the first data model and a case of the choice,
wherein the choice constitutes the first construct; and
generating, based on identifying the choice and the case of the choice, the response to include one or more configuration parameters associated with the choice,
wherein the one or more configuration parameters include the configuration parameter.

9. The method of claim 1, wherein generating the response comprises:
identifying a conditional statement of the first data model,
wherein the conditional statement constitutes the first construct;
determining that the conditional statement is satisfied; and generating, based on determining that the conditional statement is satisfied, the response to include the configuration parameter,
    wherein the configuration parameter is associated with the conditional statement.

10. A device, comprising:
one or more memories; and
one or more processors to:
    identify a first data model associated with a default configuration group;
    generate, based on the first data model, a default configuration group file;
    receive a request concerning a configuration for a microservice associated with a network management system (NMS) device;
    identify, based on the request, a second data model associated with default configuration information,
        wherein the second data model is used to provide an initial configuration of the microservice, and
        wherein the second data model includes a second hierarchical structure having a second set of constructs;
    identify, based on the request, a third data model associated with customized configuration information,
        wherein the third data model is used to provide a customization to the initial configuration of the microservice, and
        wherein the third data model includes a third hierarchical structure having a third set of constructs;
    traverse the first data model and the second data model to identify a configuration parameter that corresponds to at least one of a first construct of the first set of constructs or a second construct of the second set of constructs;
    generate, based on traversing the second data model and the third data model, a response that includes the configuration parameter for the microservice associated with the NMS device; and
    send the response to the NMS device.

11. The device of claim 10, wherein the request is a Network Configuration Protocol (NETCONF) message or a RESTCONF message.

12. The device of claim 10, wherein the first data model, the second data model, and the third data model are tree-structured data models.

13. The device of claim 10, wherein the one or more processors are further to:
    identify a first leaf of the first data model
        wherein the first leaf constitutes the first construct; and
    wherein the one or more processors, when generating the default configuration group file, are to:
    generate a second leaf in the default configuration group file that includes the configuration parameter,
        wherein the configuration parameter is associated with the first leaf of the first data model.

14. The device of claim 10, wherein the one or more processors are further to:
    identify a container of the first data model;
    determine that a child, of one or more children of the container, is associated with the configuration parameter,
        wherein the child constitutes the first construct; and
    wherein the one or more processors, when generating the default configuration group file, are to:
    add the container to the default configuration group file.

15. The device of claim 10, wherein the one or more processors are further to:
    identify a list of the first data model,
        wherein the list constitutes a third construct, of the first set of constructs; and
    wherein the one or more processors, when generating the default configuration group file, are to:
    add a wildcard expression associated with the list to the default configuration group file.

16. A non-transitory computer-readable medium storing instructions, the instructions comprising:
    one or more instructions that, when executed by one or more processors of a device, cause the one or more processors to:
        receive, from a network management system (NMS) device, a request concerning a configuration for a microservice;
        identify, based on the request, a first data model associated with default configuration information,
            wherein the first data model is used to provide an initial configuration of the microservice, and
            wherein the first data model includes a first hierarchical structure having a first set of constructs;
        identify, based on the request, a second data model associated with customized configuration information,
            wherein the second data model is used to provide a customization to the initial configuration of the microservice, and
            wherein the second data model includes a second hierarchical structure having a second set of constructs;
        traverse the first data model and the second data model to identify a configuration parameter that corresponds to at least one of a first construct of the first set of constructs or a second construct of the second set of constructs;
        generate, based on traversing the first data model and the second data model, a response that includes the configuration parameter; and
        send the response to the NMS device.

17. The non-transitory computer-readable medium of claim 16, wherein the request and the response are Network Configuration Protocol (NETCONF) messages.

18. The non-transitory computer-readable medium of claim 16, wherein the first data model and the second data model are Yet Another Next Generation (YANG) data models.

19. The non-transitory computer-readable medium of claim 16, wherein the first hierarchical structure corresponds to the second hierarchical structure.

20. The non-transitory computer-readable medium of claim 16, wherein the one or more instructions, when executed by the one or more processors, further cause the one or more processors to:
    identify a third data model associated with a default configuration group; and
    generate, based on the third data model, a default configuration group file.

* * * * *